Feb. 23, 1960     R. J. KOPF ET AL     2,925,602
FASTENER ARRESTING DEVICE FOR POWER ACTUATED TOOL
Filed Jan. 12, 1955     3 Sheets-Sheet 1

INVENTORS
Rowland J. Kopf
Charles J. DeCaro
BY
Hyde, Meyer, Baldwin & Doran
ATTORNEYS Feb. 23, 1960    R. J. KOPF ET AL    2,925,602
FASTENER ARRESTING DEVICE FOR POWER ACTUATED TOOL
Filed Jan. 12, 1955    3 Sheets-Sheet 2

INVENTORS
Rowland J. Kopf
Charles J. DeCaro
BY
Hyde, Meyer, Baldwin & Doran
ATTORNEYS Feb. 23, 1960

R. J. KOPF ET AL 2,925,602

FASTENER ARRESTING DEVICE FOR POWER ACTUATED TOOL

Filed Jan. 12, 1955

INVENTORS
Rowland J. Kopf
Charles J. DeCaro
BY

Hyde, Meyer, Baldwin & Doan
ATTORNEYS

United States Patent Office 2,925,602
Patented Feb. 23, 1960

2,925,602

FASTENER ARRESTING DEVICE FOR POWER ACTUATED TOOL

Rowland J. Kopf, Rocky River, and Charles J. De Caro, Cleveland, Ohio, assignors, by mesne assignments, to Olin Mathieson Chemical Corporation, a corporation of Virginia Application January 12, 1955, Serial No. 481,355

17 Claims. (Cl. 1—106)

This invention relates to improvements in power actuated tools and more particularly to a power actuated tool for driving a captive driveable unit.

One of the objects of the present invention is to provide a power actuated tool wherein a fastener driven thereby cannot escape into free flight.

A further object of the present invention is to provide a power actuated tool for driving a fastener into a workpiece wherein the fastener is a captive within the tool while it is being driven but in which means are provided for detachment from the tool of at least the piercing portion after driving thereof with the fastener remaining firmly embedded in the workpiece.

A further object of the present invention is to provide a power actuated tool with an abutment means movable to an operative position for stopping free flight of a driveable unit in the tool as said tool moves into firing position and movable to an inoperative position for releasing said driveable unit as said tool moves into an inactive position.

A further object of the present invention is to provide a power actuated tool characterized by its more satisfactory driving of fasteners thereby, structural simplicity, greater safety in operation and ease of operation.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 15 is a longitudinal sectional view of the Fig. 13 form but in operative position with a driveable unit driven to its normal penetration depth; while

Figure 1:
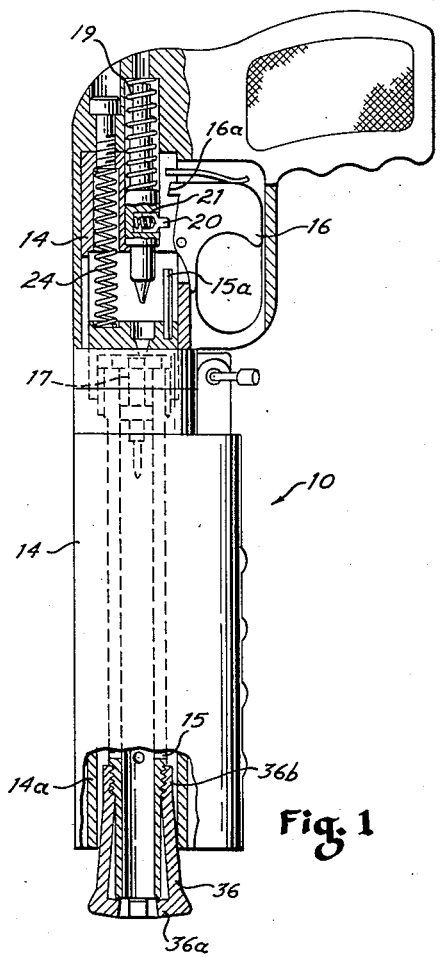
Fig. 1 is a side elevational view, partially in section, of an explosively actuated tool in the uncocked position.

Before the tool here illustrated is specifically described, it is to be understood that the invention here involved is not limited to the structural details or arrangement of parts here shown since tools embodying the present invention may take various forms. It also is to be understood that the phraseology or terminology herein employed is for purposes of description and not of limitation since the scope of the present invention is denoted by the appended claims.

Those familiar with this art will recognize that this invention may be applied in many ways. The invention, in its broader aspects, includes all types of power actuated tools with power actuation for such fastener driving tools including hydraulic, pneumatic, electromagnetic, explosive powder charge, or any other suitable type power. However, only the explosively actuated tool embodiment is described in detail herein. Tool 10 in the drawings is adapted to drive or set a fastener into the flat surface of a workpiece 11 comprising for example a covering 12 to be secured to a base portion 13.

Figure 2:
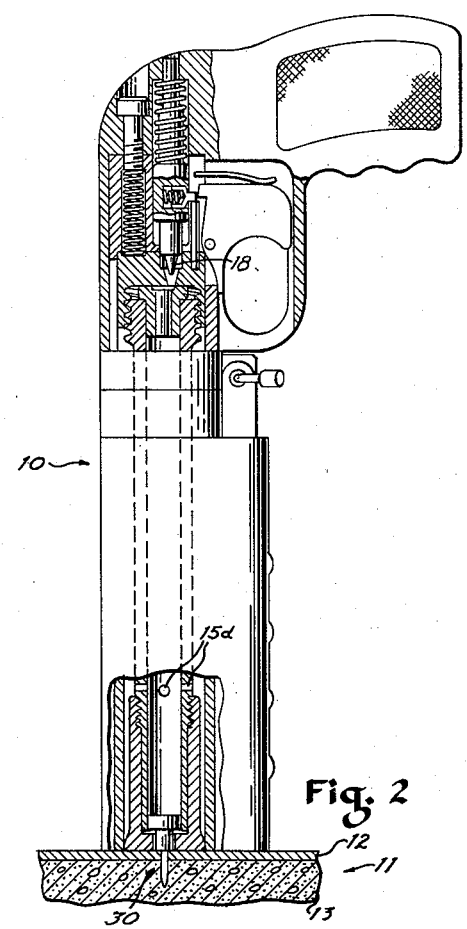
Fig. 2 is a similar view with the tool and firing pin in the cocked position but with the driveable unit in the fully driven position embedded in the workpiece.

Explosively-actuated tool 10 includes in Figs. 1 and 2 a member with a passageway for confining and driving, such as the bore of barrel 15, so that an explosive charge set off by trigger 16 can drive a driveable unit 30 through the barrel or along any suitable passageway from the breech or entry end toward the barrel muzzle or discharge end and into the workpiece 11. An example of an explosively-actuated tool on which the present invention may be used is disclosed in the copending U.S patent application entitled "Explosively-Actuated Tools," Serial No. 355,034, filed on May 14, 1953 by R. J. Kopf, R. W. Henning and R. Marsh.

In the aforementioned copending application entitled "Explosively-Actuated Tools" to which reference may be had for further disclosure if necessary, tool 10 in Fig. 1 has the flash shield and its sleeve in said copending application eliminated but includes a housing 14 with a sleeve portion 14a telescopically connected over barrel 15 with said sleeve and barrel being mounted for axial relative movement but keyed against relative rotative movement in the manner disclosed in said copending application, for example. Housing 14 has a firing means therein including a firing pin 18, biased forwardly toward the barrel muzzle into an uncocked position by compression spring 19, movable endwise in said housing between a rearward, cocked or active position and a forward, uncocked or inactive position for respectively being capable or incapable of setting off the explosive charge in cartridge case 17. When the barrel muzzle on tool 10 is pressed axially against workpiece 11, sleeve 14a telescopes forwardly from the Fig. 1 uncocked position to the Fig. 2 cocked position. Then, a pin 15a carried by the barrel engages laterally projecting firing pin pawl 20 on firing pin 18 to cock said firing pin against the bias of spring 19. Trigger 16, pivotally mounted an housing 14, has a sear 16a for depressing firing pin pawl 20 against the bias of its spring 21 to release it from pin 15a. This serves as a means for manually releasing firing pin 18 in cocked position so that its spring 19 can force it forwardly to set off the charge in cartridge 17. When tool 10 is removed from workpiece 11, spring 24 between housing 14 and barrel 15 serves as a means for normally biasing apart barrel 15 and housing 14 into the uncocked safety position shown in Fig. 1.

In a conventional explosively-actuated tool, the fastener is driven through the barrel and out of the muzzle at high speed, so that if the tool barrel is not properly set against the workpiece or if the fastener is fired into unsuitable material, the fastener may escape into the air in free flight so as to become a dangerous object. It is therefore desirable for safety reasons to prevent the escape of the fastener into free flight. This difficulty may occur when using a conventional tool if the operator attempts to fire the tool into the air instead of against the workpiece, if the operator attempts to fire the tool into the workpiece having insufficient penetration resistance so that the fastener travels completely through the workpiece to escape into free flight, if the operator fires the tool with the barrel axis substantially less than 90° with respect to the surface of the workpiece so that a ricochet occurs, etc. The present invention has solved these, as well as many other problems by having a driveable unit, including the fastener as well as a captive ram or fastener carrier piston, driven through the tool barrel by the explosively actuating gases with this ram prevented by appropriate means from escaping completely from the barrel. Hence, the fastener cannot escape into free flight to become a dangerous object.

Figures 3, 4:
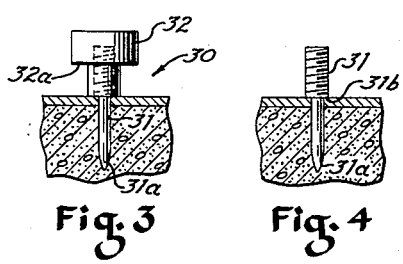
Fig. 3 is a side elevational view, partially in section, of the driveable unit, comprising a piston and fastener, after the tool has been removed therefrom.
Fig. 4 is a side elevational view of the driven fastener after the fastener carrier piston has been removed therefrom.

In the present disclosure, each tool 10 in Figs. 1–16 has a captive driveable unit 30 including fastener 31 detachably connected by screw threads in Figs. 3 and 4 to a fastener carrier, such as the element 32 here shown, which is designated herein as piston, head or ram. The fastener has a forwardly projecting piercing portion 31a for penetrating the workpiece after being driven through the barrel while the piston has an abutment means or shoulder 32a thereon to be described in further detail hereinafter. The ram or piston 32 is shown as being internally threaded to accept the fastener, but in the event the fastener has an internally threaded head, the ram or piston may be externally threaded to engage the fastener.

It will also be apparent as the description proceeds, that the tool will work in basically the same manner if the fastener can be designed with an outline having the shape of the whole driveable unit so that the unit is one integral member with the ram or piston portion being integrally a part of the driven fastener so that a separate ram or piston is not required.

The safety features of the present invention are not required under normal conditions when there is no danger of having the fastener escape into free flight. During tool loading, the piston 32 is screwed onto the thread of fastener 31 so as to form the driveable unit 30 and then this unit is inserted into the breech of the tool barrel 15 by detaching rear portions of housing 14 and barrel 15 from front portions thereof to open the breech in the manner disclosed in said copending application. Then, the explosive charge, shown as cartridge 17 in Fig. 1, is also inserted into the breech as a separate unit after which the breech of the tool is closed so that the tool can be moved to the firing pin cocked position against the workpiece 11 in Fig. 2. It will also be apparent hereinafter that each tool could be loaded with the unit from the muzzle instead of the breech, if so desired. After trigger 16 is pulled, the fastener 31 is driven into the workpiece to its normal and desired penetration shown in Figs. 2, 3, 4, 8, 11 and 15 wherein the shoulder 31b on the fastener in Fig. 4 generally limits the penetration thereof.

The drivable unit may be held in the barrel bore in any suitable manner, if necessary, before the tool is fired so as to control the size of the initial explosive charge chamber and to properly drive the fastener. This may take the form of friction between barrel bore and piston 32 or other suitable retaining means, and this is especially desirable when the tool barrel is pointed downwardly, as in Fig. 2, so as to hold the fastener carrier piston against axial downward movement under only the weight of the drivable unit.

However, if the tool is fired so that there is a possibility of having the fastener escape into free flight to become a dangerous object, the safety feature prevents this normal occurrence by engagement between suitable abutment means when the drivable unit in any of these tools attempts to travel outwardly through the barrel substantially beyond the Figs. 2, 3, 8, 11 and 15 positions. Each tool barrel has a uniform bore diameter throughout most of its length of a size to permit free passage of the unit 30 therethrough with no excess clearance or slop. However, an abutment means on the tool is located at the muzzle to arrest the forward travel of the piston or ram 32 while permitting free passage of the piercing portion 31a of the fastener for workpiece penetration. This abutment means on the tool is capable of coacting with the abutment means 32a on the piston or ram to prevent further axial travel of the drivable unit through the barrel and thus to prevent the free escape of the drivable unit from the tool. Hence, the drivable unit is stopped as its piercing portion 31a emerges a predetermined distance beyond the barrel muzzle so as to control the penetration of the workpiece or travel beyond the muzzle independently of the resistance to penetration of the workpiece material or of the explosive driving force.

Figure 5:
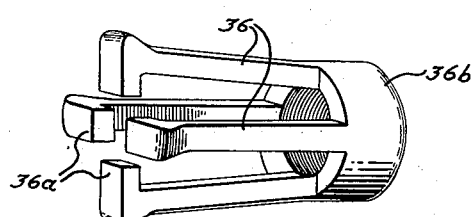
Fig. 5 is a perspective view of the collet type fingers mounted on the barrel at the muzzle in Figs. 1 and 2.
Figure 6:
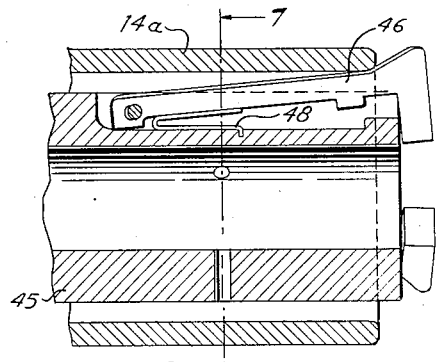
Fig. 6 is a longitudinal sectional view of a second form of fastener arresting device in inoperative position at the barrel muzzle.
Figure 7:
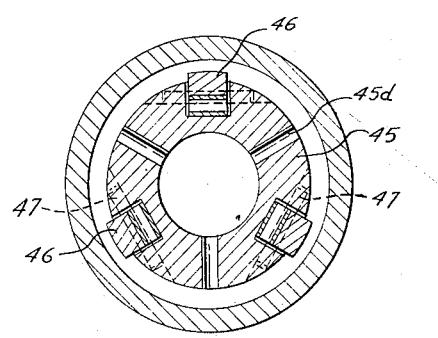
Fig. 7 is a transverse sectional view taken along the line 7—7 of Fig. 6.
Figure 8:
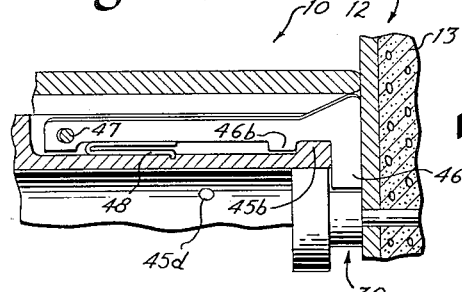
Fig. 8 is a longitudinal sectional view of the Fig. 6 form of the invention in operative position for fastener arresting.
Figure 10:
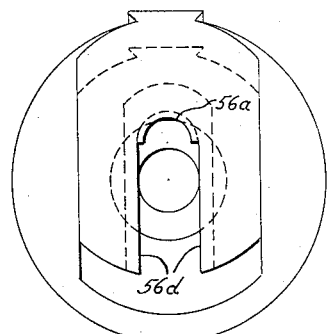
Fig. 10 is an end view looking toward the left from the right end of Fig. 9.
Figure 9:
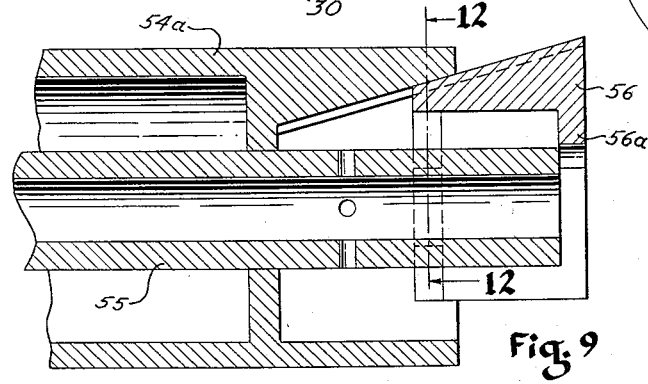
Fig. 9 is a longitudinal sectional view of a third form of fastener arresting device shown in the inoperative position.
Figure 11:
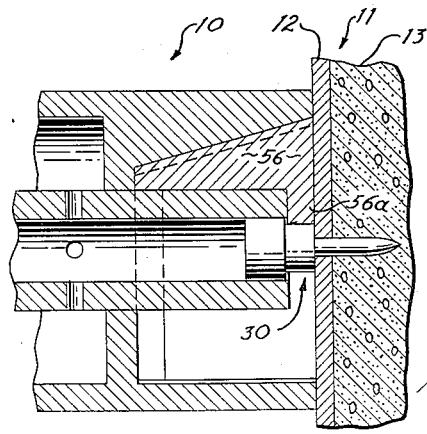
Fig. 11 is a longitudinal sectional view of the Fig. 9 fastener arresting device in the operative position with the piercing portion of a driveable unit driven into a workpiece to its normal penetration depth.
Figure 12:
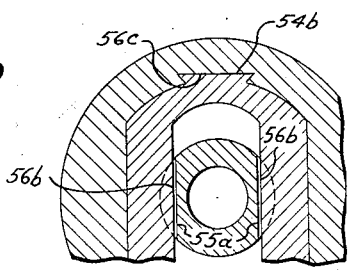
Fig. 12 is a transverse sectional view taken along the line 12—12 of Fig. 9.

This abutment means on the tool may take various forms as shown in the different figures of the drawings. In Figs. 1, 2 and 5, a plurality of fingers 36 are joined together to form a collet by an integral ring 36b having internal threads screwed onto barrel 15 in Figs. 1 and 2 with this construction inherently providing spring means to bias fingers 35 outwardly to the Figs. 1 and 5 positions. Each finger has an inwardly extending integral hook portion 36a to form said abutment means on the tool. In Figs. 6, 7 and 8, a plurality of fingers 46 are each pivotally mounted by a pin 47 to a modified form of tool barrel 45 with each finger having an inwardly extending integral hook portion 46a to form said abutment means on the tool. A spring 48 biases its associated finger outwardly toward the Fig. 6 position.

In Figs. 9–12, a block 56 has guides 56b, 56b slidably movable in parallel grooves 55a, 55a formed in opposite sides of a modified form of barrel 55 to permit generally radial or straight line movement of block 56 transversely relative to said barrel. A modified form of sleeve 54a and the block 56 have a dovetail slide connection 54b, 56c coacting together so that the sleeve can control movement of said block. A flange 56a on said block forms the abutment means on the tool while cutout 56d thereon is larger than the bore diameter of said barrel.

Figure 13:
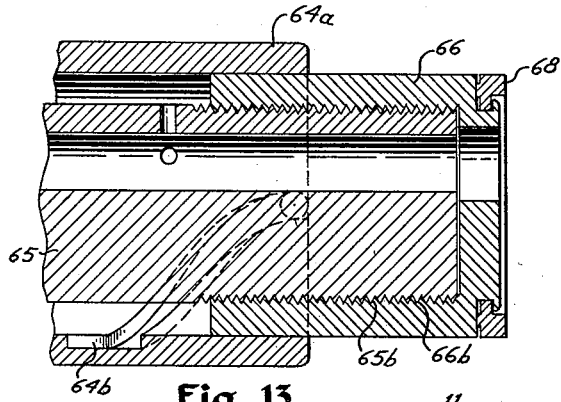
Fig. 13 is a longitudinal sectional view of a fourth form of fastener arresting device and barrel muzzle in inoperative position.
Figure 14:
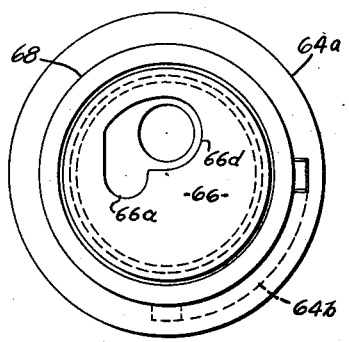
Fig. 14 is an end view looking toward the left at the right end of Fig. 13.
Figure 15:
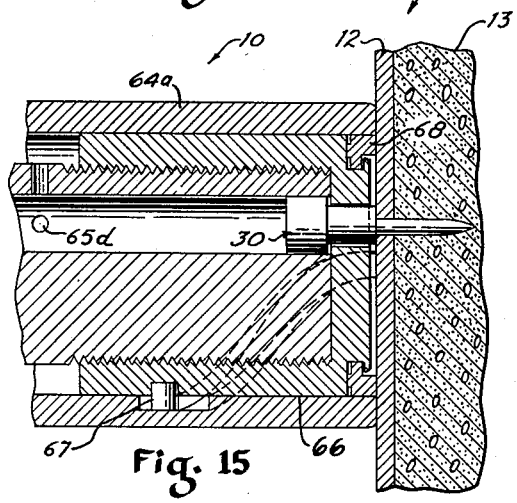
Figure 16:
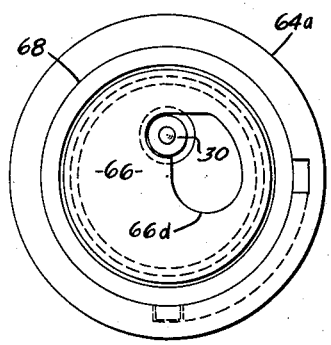
Fig. 16 is an end view of the tool in Fig. 15 looking toward the left with the workpiece removed therefrom.

In Figs. 13–16, block 66 is mounted for rotation about an axis parallel to the axis of an off-center bore in a modified barrel 65 by any suitable rotatable connection but shown herein as screw threads 65b, 66b. A modified form of sleeve 64a has a continuous slot or groove 64b in the bore thereof and at least partially helical in form for receiving a projecting pin 67 on block 66 to form a helical cam connection for rotating block 66 on barrel 65 in response to axial movement of sleeve 64a. As best shown in Figs. 14 and 16, block 66 is provided in its circular front end wall with (a) a cut out 66a of a size smaller than that of the headed portion 32 of the driveable unit 30 to thereby form a tool abutment means for said driveable unit and (b) with a cut out 66d of a size larger than that of said driveable unit headed portion 32 to thereby permit the removal of the tool from said driveable unit after use of the tool. In Figs. 13 and 14, the tool parts are in the position which they occupy when the tool is in its uncocked position, such as after use of the tool for example, and in this position of the tool parts, the block cut out 66d is in alignment with the tool barrel bore—a position in which the tool is removable from the driveable unit 30. In Figs. 15 and 16, the tool parts are in the position which they occupy when the tool has just been fired, the block cut out 66a now being in alignment with the tool barrel bore, with consequent retention of the headed portion 32 of the driveable unit 30. Upon forward telescopic movement of the tool sleeve 64a relative to the tool barrel 65 and tool block 66 from the position in Figs. 13 and 14 to the position in Figs. 15 and 16, the cooperative engagement of the sleeve cam slot 64b and the block pin causes the block 66 to turn ninety degrees (90°) about the tool barrel from the Figs. 13, 14 position to the Figs. 15, 16 position, with consequent movement of block cut out 66a from its non-operative position to its operative position and conversely, movement of block cut out 66d from its operative to its non-operative position. Upon movement of the tool parts from the Figs. 15, 16 position to the Figs. 13, 14 position, reverse ninety degree (90°) rotary movement of the block 66 occurs, with corresponding reverse movements of the block cut outs, all as will be readily understood.

In each form of the invention, the abutment means on the tool is operatively mounted on the discharge end of the tool for movement into either an operative position (Figs. 2, 8, 11 or 15) in alignment with the barrel bore or passageway so as to be in the path of travel of the driveable unit 30 and the abutment surface 32a thereon to be effective for stopping said unit or an inoperative position (Figs. 1, 6, 9 or 13) out of said path and out of alignment with the barrel bore or passageway to permit removal of unit 30 therefrom after the fastener has been driven. In each form, movement of the tool sleeve axially over the barrel causes the tool abutment means—hooks 36a, 46a, flange 56a or cutout 66a—to move between said positions by the operative connection therebetween. Although a tool barrel is disclosed for performing the disclosed functions in the illustrated and preferred form, any suitable actuating means may be used. In Figs. 1-12, forward movement of sleeves 14a, 54a respectively move fingers 36, 46 and block 56 radially or transversely inwardly along a straight line from the inoperative positions in Figs. 1, 6 and 9 to the operative positions in Figs. 2, 8 and 11. In Fig. 8, coacting stop lugs 45b, 46b abut against each other on each finger 46 to take the strain off pivot pin 47 when the abutment means engage; finger 46 loosely fits on pin 47 so that these stop lugs take any force exerted by the driveable unit. In Figs. 13-16, similar movement of sleeve 64a rotates block 66 from the inoperative position in Figs. 13 and 14 to the operative position in Figs. 15 and 16. Bearing ring 68 is rotatably mounted on the end of block 66 to permit relative rotation between workpiece 11 and block 66 when they are pressed together.

In each operative position, workpiece 11 backs up the abutment means on the tool to help absorb the energy of the driveable unit 30. Hence, in each form of the invention movement of the sleeve relative to the barrel between Figs. 1 and 2 positions, for example, causes not only movement of the abutment means on the tool between inoperative and operative positions but also causes movement of firing pin 18 between uncocked and cocked positions. As the tool barrel muzzle is pressed against the workpiece, the relative movement moves firing pin 18 to cocked position and moves the abutment means on the tool to the Fig. 2 operative position. After trigger 16 has been pulled to release firing pin 18 to firing position and driveable unit 30 is driven to the Fig. 2 position or if the operator desires to return the tool to the safety position with firing pin 18 uncocked in the Fig. 1 position, he merely withdraws the tool axially from workpiece 11. The relative movement moves the tool abutment means to the Fig. 1 inoperative position and moves the firing pin 18 to the uncocked, safety position. Hence, the automatic operation of this invention cooperates perfectly with the operation of the tool disclosed in said copending application.

In Figs. 13 and 15, groove 64b in sleeve 64a is of continuous form but has a helical portion and a longitudinal portion. The helical portion rotates block 66 in response to axial movement of sleeve 64a on barrel 65. The longitudinal portion permits relative axial movement of sleeve 64a on barrel 65 without further rotating block 66 so that the tool may be fired in the same manner as the tool disclosed in said copending application without difficulty. The barrel length from bearing ring 68 to cocking pin 15a is constant as firing pin 18 approaches the cocked position so that firing pin pawl 20 will always align in the same manner with trigger sear 16a for proper firing. Also, when the tool barrel axis is tilted from the perpendicular to the workpiece surface, the angle fire or tilt control described in said copending application still prevent firing of said tool because trigger sear 16a and pawl 20 do not align at approximately the same tilt since this barrel length remains constant over the range of permissible tilt.

This construction provides greater safety in tool operation as well as more satisfactory setting of the fasteners. It prevents the free escape of a fastener. The tool operator cannot dangerously fire the fastener into free flight, as a dangerous object, by firing the tool into the air instead of against the workpiece. If the workpiece does not have sufficient resistance to penetration, there exists neither the danger that the fastener will emerge from the other side of the workpiece as an object in free flight nor the danger that the fastener will be overdriven beyond the depth control established by the engagement of the abutment means on the driveable unit and at the barrel muzzle. Substantial inclination of the barrel bore from the normal to the workpiece surface will not cause a ricochet since the fastener cannot escape into free flight.

When the fastener is driven either to the normal penetration position of Figs. 2, 8, 11 or 15 or is driven beyond this point until the abutment means engage, the driveable unit 30 can be removed from the bore of the tool while the fastener remains embedded in the workpiece. In each form of the invention, both the fastener 31 and the fastener carrier piston or captive ram 32 are easily disengaged as a unit from the tool after firing by pulling the tool axially off the unit 30. When the tool has been removed from the driveable unit 30, the latter then has the appearance shown in Fig. 3. Then, the piston 32 may be unscrewed for re-use and the remaining driven fastener 31 is shown in Fig. 4.

In Fig. 3, the fastener is shown as being screwed into the piston or captive ram to the full thread depth. However, it is possible to manually adjust the position wherein the safety feature on each of the tools takes effect. The tool operator can pre-set this distance by adjusting the screw thread engagement before the fastening unit is inserted into the tool.

Gas ports 15d, 45d, 55d and 65d are preferably provided in the respective tool barrels in Figs. 2, 8, 11 and 15 to permit gas escape from behind piston 32 before unit 30 reaches the normal penetration positions shown in said figures so as not only to reduce the likelihood of high and dangerous pressures developing in the tool barrel but also to minimize tool lift off the workpiece caused by the expanding pressure of the gas in the barrel bore tending to move the tool if the unit 30 stops before the abutment means engage.

Various changes in details and arrangement of parts can be made by one skilled in the art without departing from either the spirit of this invention or the scope of the appended claims.

What we claim is:

1. A power actuated tool including a first means providing a passageway so that a driveable unit can be power driven through said passageway toward the discharge end thereof, said tool adapted to drive along said passageway a driveable unit including a head having an abutment means thereon and adapted to carry along said passageway a forwardly projecting piercing portion of a fastener for penetrating a workpiece, said tool being movable between an actuating position against the workpiece and an inactive position removed from the workpiece, an abutment means on said tool operatively mounted for movement into an operative position in the path of said first mentioned abutment means for stopping said head at the discharge end of the passageway with the piercing portion adapted to travel a predetermined distance beyond the discharge end for workpiece penetration with said operative position corresponding to said actuating position or into an inoperative position out of said path to permit separation of said head and the passageway with said inoperative position corresponding to said inactive position, and a second means responsive to moving said tool to one of said positions for simultaneously moving said second mentioned abutment means into its corresponding position, said tool including means operatively connecting together said first and second means and the second mentioned abutment means.

2. A power actuated tool including a first means providing a passageway so that a driveable unit can be power driven through said passageway toward the discharge end thereof, said tool adapted to drive along said passageway a driveable unit including a head having an abutment means thereon and adapted to carry along said passageway a forwardly projecting piercing portion of a fastener for penetrating a workpiece, an abutment means on said tool operatively mounted for movement into an operative position in the path of said first mentioned abutment means for stopping said head at the discharge end of the passageway with the piercing portion adapted to travel a predetermined distance beyond the discharge end for workpiece penetration or into an inoperative position out of said path to permit separation of said head and the discharge end, a second means on said tool for moving said second mentioned abutment means into said operative position in response to movement of said tool into activating position against the workpiece, and a third means on said tool for moving said second mentioned abutment means into said inoperative position in response to removal of said tool from the workpiece, said tool including means operatively connecting together said first, second and third means and the second mentioned abutment means.

3. An explosively actuated tool including a first means providing a passageway so that an explosively activated powder charge can drive a driveable unit through said passageway toward the discharge end thereof and including a firing pin on said tool movable between cocked and uncocked positions respectively for being capable of setting off or incapable of setting off the explosive charge, said tool adapted to drive along said passageway a driveable unit including a head having an abutment means thereon and adapted to carry along said passageway a forwardly projecting piercing portion of a fastener for penetrating a workpiece, an abutment means on said tool operatively mounted for movement into an operative position in the path of said first mentioned abutment means for stopping said head at the discharge end of the passageway with the piercing portion adapted to travel a predetermined distance beyond the discharge end for workpiece penetration or into an inoperative position out of said path to permit separation of said head and the passageway, said operative and inoperative positions respectively corresponding to said cocked and a second uncocked position, and means on said tool responsive to movement of said firing pin to one of said positions for moving said second mentioned abutment means into its corresponding position, said tool including means operatively connecting together said firing pin and said first and second means and the second mentioned abutment means.

4. A power actuated tool including a barrel so that a driveable unit can be power driven through said barrel toward the barrel muzzle and including a sleeve telescopically connected over said barrel, said sleeve and barrel being mounted for axial relative movement, said tool adapted to drive through said barrel a driveable unit including a head having an abutment means thereon and adapted to carry through said barrel a forwardly projecting piercing portion of a fastener for penetrating a workpiece, an abutment means on said tool operatively mounted for movement into an operative position in alignment with the barrel bore for stopping said head at the barrel muzzle with the piercing portion adapted to emerge a predetermined distance beyond the muzzle for workpiece penetration or into an inoperative position out of alignment with said barrel bore to permit separation of said head and the barrel bore, a first means on said tool operatively connecting said sleeve to said second mentioned abutment means for moving said second mentioned abutment means into said operative position and for moving said second mentioned abutment means into said inoperative position respectively in response to relative movement of said barrel and sleeve in opposite directions, and a second means on said tool normally biasing said barrel and sleeve into said inoperative position, said tool including means operatively connecting together said barrel, said sleeve, said first and second means and the second mentioned abutment means.

5. A power actuated tool including a barrel having a bore so that a driveable unit can be power driven through said barrel toward the barrel muzzle and including a housing operatively connected with said barrel, said housing and barrel being mounted for axial relative movement, said tool adapted to drive through said barrel a driveable unit including a head having an abutment means thereon and adapted to carry through said barrel a forwardly projecting piercing portion of a fastener for penetrating a workpiece, an abutment means on said tool operatively connected with said barrel and mounted for movement into an operative position in the path of said first mentioned abutment means for stopping the head of said unit with the piercing portion emerging a predetermined distance beyond the muzzle for workpiece penetration and into an inoperative position out of said path to permit separation of said head from the barrel bore, and a first means on said tool operatively connecting said housing to said second mentioned abutment means for moving said second mentioned abutment means into one of said positions in response to relative movement between said housing and barrel.

6. A tool, as set forth in claim 5, and wherein a block has a portion defining said second mentioned abutment means, said block being mounted for rotatable movement at said barrel muzzle about an axis spaced from and parallel to the barrel bore axis, said first means including a helical cam connection operatively connecting said housing and block and operable to rotate said block in response to axial relative movement between said housing and barrel, said block having angularly spaced about its axis of rotation said second mentioned abutment means and a cut-out larger than the bore diameter registrable respectively with said barrel bore in said operative and inoperative positions.

7. An explosively actuated tool including a first means providing a passageway so that an explosively actuated powder charge disposed therein can drive a drivable unit through said passageway toward the discharge end thereof and including a firing pin on said tool movable between cocked and uncocked positions and capable of setting off said explosive charge, the firing of said charge by said firing pin being effective to drive along said passageway a drivable unit including a head having an abutment means thereon and adapted to carry along said passageway a forwardly projecting piercing portion of a fastener for penetrating a workpiece, and abutment means operatively connected with said first named means and mounted for movement into an operative position in the path of said first mentioned abutment means for stopping the head of said drivable unit at the discharge end of said passageway with the piercing portion of said unit extending a predetermined distance beyond said discharge end, cocking means operatively connected with said first named means and operatively engageable with said firing pin for cocking the latter, actuator means in said tool concomitantly movable with the cocking of said firing pin to a first position relative to said first named means for moving said second named abutment means into said operative position, trigger means operatively engageable with said firing pin for releasing said firing pin from said cocked position to effect the firing of said charge and the movement of said firing pin to said uncocked position, and said actuator means being movable to a second position relative to said first named means to effect the movement of said second named abutment means into said inoperative position.

8. A powder actuated tool including means providing a passageway so that a drivable unit can be powder driven through said passageway toward the discharge end thereof and including a housing having actuating means, said housing being movable relative to said first named means to carry said actuating means between a first and a second position, said tool adapted to drive along said passageway a drivable unit including a head having an abutment means thereon and adapted to carry along said passageway a forwardly projecting piercing portion of a fastener for penetrating a workpiece, an abutment means on said tool operatively connected with said first named means and mounted for movement into an operative position in the path of said first mentioned abutment means for stopping said head with the piercing portion extending a predetermined distance beyond said discharge end for workpiece penetration and into an inoperative position out of said path to permit separation of said head and said passageway, said actuating means being operatively connected with said second mentioned abutment means and responsive to a movement to said first position to move said second mentioned abutment means to said operative position and responsive to a movement to said second position to move said second abutment means to said inoperative position.

9. A tool as set forth in claim 8 and wherein said second mentioned abutment means is mounted for generally transverse, straight line movement relative to said passageway.

10. A tool as set forth in claim 8 and wherein a block has a portion defining the said second mentioned abutment means, said block being mounted for movement relative to said passageway at the discharge end of the latter, said block having spaced apart thereon said second mentioned abutment means and a cutout portion larger than the transverse dimension of said head registrable respectively with said passageway.

11. A tool as set forth in claim 8 and wherein a block has a portion defining said second mentioned abutment means, said block being mounted for generally straight line transverse movement at the discharge end of said passageway, said block having spaced apart thereon along a straight line said second mentioned abutment means and a cutout portion larger than the transverse dimension of said head of said drivable unit registrable respectively with said passageway in said operative and inoperative positions.

12. A tool as set forth in claim 8 and wherein a block has a portion defining said second mentioned abutment means, said block being mounted on said tool and operatively connected to said first named means and rotatably movable at the discharge end of said passageway.

13. A tool as set forth in claim 8 and wherein a block has a portion defining said second mentioned abutment means, said block being mounted for generally rotatable movement at the discharge end of said passageway about an axis disposed in parallel spaced relation to the axis of said passageway, said block having angularly spaced about its axis of rotation said second mentioned abutment means and a cutout portion larger than the transverse dimensions of said head registrable respectively with said passageway in said operative and inoperative positions.

14. A powder actuated tool including a first means providing a passageway so that a drivable unit can be powder driven through said passageway toward the discharge end thereon and including a housing having actuating means, said housing being selectively movable relative to said first named means to carry said actuating means between a first and a second position, said tool adapted to drive along said passageway a drivable unit including a head having an abutment means thereon and adapted to carry along said passageway a forwardly projecting piercing portion of a fastener for penetrating a workpiece, an abutment means on said tool operatively connected with said first named means and mounted for movement into an operative position in alignment with the passageway for stopping the head of said unit at the discharge end of the passageway with the piercing portion extending a predetermined distance beyond said discharge end and into an inoperative position out of alignment with said passageway to permit separation of said head and said passageway, said actuating means being operatively connected with said second mentioned abutment means for moving the latter into said operative position in response to said actuating means being moved to said first position and for moving said mentioned abutment means into said inoperative position in response to the movement of said actuating means to said second position, and means on said tool operatively connected to said housing for normally biasing said actuating means into said second position.

15. A powder actuated tool including means providing a passageway so that a drivable unit can be powder driven through said passageway toward the discharge end thereof and including a housing having actuating means, said housing being movable relative to said first named means to carry said actuating means between a first and second position, said tool being adapted to drive along said passageway a drivable unit including a head having a first abutment means thereon and adapted to carry along said passageway a forwardly projecting piercing portion of a fastener for penetrating a workpiece, a second abutment means on said tool operatively connected with said first named means and mounted for movement into an operative position in the path of said first mentioned abutment means for stopping said head with the piercing portion extending not more than a predetermined distance beyond said discharge end for workpiece penetration and into an inoperative position out of said path to permit separation of said head and said passageway, said second abutment means being mounted for generally transverse movement at the discharge end of said passageway with bias towards one of its positions, said actuating means being operatively engaged with said second abutment means and responsive to movement to said first position to move said second abutment means to the other of its positions against said bias, said actuating means in response to movement to said second position permitting said second abutment means to move with said bias to said one position.

16. A tool as set forth in claim 15 and wherein said second mentioned abutment means comprises a plurality of fingers mounted for generally transverse movement at the discharge end of said passageway, said fingers being secured to said first named means providing said passageway by a ring integrally formed with said fingers to bias the latter to the inoperative one of said positions, and said actuating means being responsive to movement to said first position to move said fingers to the other of said positions against said bias, and said tool including means operatively connecting said first named means and said ring.

17. A tool as set forth in claim 15 and wherein said second mentioned abutment means comprises a finger mounted for generally transverse movement at the discharge end of said passageway, said finger being pivotally mounted to said first named means, spring means biasing said finger to the inoperative one of its positions, and said actuating means being responsive to movement to said first position to move said finger into said operative position and in opposition to the bias of said spring means, and said first named means including means operatively supporting said spring means.

References Cited in the file of this patent

UNITED STATES PATENTS

| | | |
|---|---|---|
| 1,365,869 | Temple | Jan. 18, 1921 |
| 2,221,157 | Temple | Nov. 12, 1940 |
| 2,679,645 | Erickson | June 1, 1954 |

FOREIGN PATENTS

| | | |
|---|---|---|
| 1,055,269 | France | Oct. 14, 1953 |
| 1,058,870 | France | Mar. 19, 1954 |
| 729,824 | Great Britain | May 11, 1955 |